United States Patent [19]

Becerra-Novoa et al.

[11] Patent Number: 4,584,016

[45] Date of Patent: Apr. 22, 1986

[54] METHOD FOR CONTROLLING METALLIZATION AND CARBURIZATION IN THE REDUCTION OF METAL ORES TO SPONGE IRON

[75] Inventors: Jorge O. Becerra-Novoa, Apodaca; Francisco Cantu-Hernandez; Enrique R. Martinez-Vera, both of Monterrey, all of Mexico

[73] Assignee: Hylsa, S.A., Monterrey, Mexico

[21] Appl. No.: 668,173

[22] Filed: Nov. 2, 1984

Related U.S. Application Data

[63] Continuation of Ser. No. 360,902, Mar. 23, 1982, abandoned.

[51] Int. Cl.$^4$ .............................................. C21B 13/02
[52] U.S. Cl. ......................................................... 75/35
[58] Field of Search ............................................. 75/35

[56] References Cited

U.S. PATENT DOCUMENTS

| | | | |
|---|---|---|---|
| 3,853,538 | 12/1974 | Nemeth | 75/35 |
| 4,179,281 | 12/1979 | Ono et al. | 75/35 |
| 4,224,057 | 9/1980 | Martinez-Vera et al. | 75/35 |
| 4,336,063 | 6/1982 | Guzman-Bofill et al. | 75/35 |

Primary Examiner—Melvyn J. Andrews
Attorney, Agent, or Firm—Curtis, Morris & Safford

[57] ABSTRACT

A method of operating a vertical moving bed reduction reactor for reducing iron ore to sponge iron and having a reduction zone in the upper portion thereof and a cooling zone in the lower portion thereof to obtain a desired degree of metallization of the reduced ore in said reduction zone and a desired degree of carburization in said cooling zone which comprises supplying to said reactor a predetermined flow of reducing gas comprising carbon monoxide and hydrogen and, varying the ratio of reducing gas flow to said reduction zone to the reducing gas flow to said cooling zone to vary at least one of the amount of metallization attained in said reduction zone and the amount of carburization attained in said cooling zone, maintaining the carbon dioxide concentration in said reduction zone at a value which yields the desired degree of metallization therein and maintaining the carbon dioxide concentration in said cooling zone at a value which yields the desired degree of carburization in said cooling zone.

6 Claims, 4 Drawing Figures

% METALLIZATION VS. $F_4/F_0$ RATIO

% CARBON VS. $F_4/F_0$ RATIO

% METALLIZATION VS. $F_4/F_0$ RATIO

% CARBON VS. $F_4/F_0$ RATIO

% CARBON ABSORBED AS $CO_2$ VS. $F_4/F_0$ RATIO

METHOD FOR CONTROLLING METALLIZATION AND CARBURIZATION IN THE REDUCTION OF METAL ORES TO SPONGE IRON

This application is a continuation, of application Ser. No. 360,902, filed Mar. 23, 1982 now abandoned.

FIELD OF THE INVENTION

This invention relates to the gaseous reduction of particulate metal ores to metals in particulate form in a moving bed, vertical shaft reactor; and more particularly, to a method for the production of a "balanced" sponge metal product having a preselected and controlled level of metallization and carburization. The invention is in a method which provides a higher degree of process flexibility and control with respect to the metallization and carburization of the sponge iron product by regulating the amount of carbon dioxide in the process gas and regulating the distribution of fresh reducing gas to the reduction and cooling loops. In addition to the balanced sponge metal product which is obtained by the method of the invention the consumption of natural gas is reduced to improve the overall energy efficiency of the reduction process. It is to be noted that although the description which follows specifically relates to a method and apparatus for the reduction of iron ore to sponge iron, it will be evident to those skilled in the art that the invention is equally applicable to the treatment of ores other than iron ore.

BACKGROUND OF THE INVENTION

Typically, the production of sponge iron in a vertical shaft, moving bed reactor involves two principal steps; namely, reduction of the ore in a reduction zone through which is passed a suitable hot reducing gas largely composed of carbon monoxide and hydrogen at temperatures in the range of 700° C. to 1000° C., preferably 750° C. to 950° C., and cooling of the reduced sponge iron in a cooling zone through which is passed a gaseous coolant at a temperature below about 200° C., preferably below 100° C. Systems of this general type are disclosed in U.S. Pat. Nos. 3,765,872, 3,816,102, and 4,216,011 wherein a vertical reactor is used having a reduction zone in the upper portion thereof and a cooling zone in the lower portion thereof. The ore to be treated is charged to the top of the reactor and caused to flow downwardly through the reduction zone wherein it is reduced by heated reducing gas, after which the reduced ore flows into and downwardly through the cooling zone to be cooled and carburized by contact with a stream of suitable cooling gas. The cooled sponge iron is then discharged through the bottom of the reactor. Typically, both the reducing gas and cooling gas are recirculated, optionally in closed loops, to which streams of fresh (i.e. "make-up") reducing gas are added and from which streams of spent gas are removed.

In various known direct reduction processes, the reducing gas required for reduction of the iron ore is generated in a catalytic reforming unit by conversion of natural gas in accordance with the following reactions:

$$CH_4 + H_2O \rightarrow CO + 3H_2 \qquad (1)$$

$$CH_4 + CO_2 \rightarrow 2CO + 2H_2 \qquad (2)$$

In the reforming reactions the natural gas comprised mainly of methane is converted to hydrogen and carbon monoxide in the presence of an oxidizing agent of either water or carbon dioxide. As a result, the reformed gas is substantially composed of hydrogen and carbon monoxide. In recent times, due to the ever decreasing availability and increasing cost of natural gas it has become extremely important and therefore desirable to develop a direct reduction process in which the required quantity of natural gas is minimized.

The reducing gas being fed to the reduction zone of the reactor is typically at an elevated temperature and is caused to contact the downwardly moving iron ore to reduce the iron oxides therein according to the following basic reactions:

$$3Fe_2O_3 + H_2/CO \rightarrow 2Fe_3O_4 + H_2O/CO_2 \qquad (3)$$

$$Fe_3O_4 + H_2/CO \rightarrow 3FeO + H_2O/CO_2 \qquad (4)$$

$$FeO + H_2/CO \rightarrow Fe + H_2O/CO_2 \qquad (5)$$

The spent reducing gas leaving the reactor is cooled to remove water produced by the reduction of the iron ore with hydrogen after which the cooled and de-watered effluent gas is recycled to the reduction zone of the reactor. The recirculation, or recycling, of the effluent gas can be accomplished in various ways; for example by recycling the gas directly back into the reactor or by recycling the gas first through the reformer and heater or by recycling the gas through the heater only. In each case, however, fresh reducing gas is added to the recycled effluent gas prior to injection into the reactor. Since the amount of carbon dioxide generated in the process by the reduction reactions occurring in the reactor is considerable, a portion of the spent gas must be vented or purged from the system to maintain a proper overall carbon balance within the reduction system.

As described above, the fresh reducing gas which is typically generated by the catalytic conversion of methane present in the natural gas fed to the process constitutes a net carbon feed to the process due to the carbon content of the natural gas. In order to operate the reduction process under steady state conditions and in a continuous manner, it is necessary to remove carbon from the system in an amount essentially equivalent to the net amount of carbon being added. Carbon can leave the system in combined form with the sponge iron in the form of ferric carbide or in gaseous form as CO, $CO_2$. and $CH_4$ being vented from the spent gas recycle loop.

A proper balance between the amount of carbon entering and leaving the process is necessary to avoid excessive carbon deposition on the sponge iron burden moving through the reactor. Although carbon can be effectively eliminated from the process by venting at least a portion of the effluent gas from the reactor, hydrogen which is also present in the gas effluent and is particularly effective as a reductant is also lost from the process.

Therefore, a real need exists for a direct gaseous reduction process in which carbon can be eliminated from the process without attendant loss of valuable reducing components such as hydrogen and methane. A need also exists for a reduction process which provides a greater amount of flexibility and control of the level of metallization and carburization of the sponge iron product. Such flexibility of operation is desirably achieved simultaneous with optimization of the overall energy consumption of the direct reduction process.

SUMMARY OF THE INVENTION

By the present invention a method and apparatus is provided which provides greater flexibility of operation in the degree of metallization and carburization of the sponge iron product while simultaneously minimizing the consumption of natural gas to the reduction process and optimizing the overall energy requirement.

It is an object of the present invention to provide a novel method and apparatus for the direct reduction of iron ore to sponge iron wherein a desired level of metallization and carburization of the sponge iron product can be selected and regulated.

It is another object of the present invention to provide a direct reduction process and apparatus wherein the natural gas consumption is minimized and the overall energy consumption is optimized.

It is still a further object of the invention to provide a novel method and apparatus for the direct reduction of sponge iron to sponge metal wherein the overall carbon balance is effectively controlled. Other objects of the invention will be in part obvious and in part pointed out hereafter.

GENERAL DESCRIPTION

As conducive to a clearer understanding of the present invention, it is pointed out that the reduction of FeO in the reduction zone of the reactor is effected by reaction with a hot reducing gas composed largely of carbon monoxide and hydrogen as follows:

$$CO + FeO \rightarrow Fe + CO_2 \tag{6}$$

$$H_2 + FeO \rightarrow Fe + H_2O \tag{7}$$

The carburization reactions occurring in the reactor concurrently with the reduction reactions can be represented by the following equations:

$$2CO \rightarrow C + CO_2 \tag{8}$$

$$3C + Fe \rightarrow FeC_3 \tag{9}$$

It is known that the above carburization reactions are favored at temperatures in the range of about 500° C. to 700° C. and that carbon deposition on the sponge iron therefore tends to occur to a much greater degree in the cooling zone of the reactor. From equation 8 it is clear that the rate of carburization in the reduction zone and the cooling zone is controlled to a large extent by the concentration of CO present in the reducing or cooling gas. Similarly, by equation (6) it can be observed that the rate of reduction is largely controlled by the concentration of CO in the reducing gas.

As described above, it is known to eliminate carbon from the reduction process to achieve a desired overall carbon balance by venting at least a portion of the spent gas recycle. The present invention provides an alternative method and apparatus for the selective elimination of carbon from the reduction system by the controlled absorption of carbon dioxide from the spent gas being recycled to the reactor. By the absorption of carbon dioxide from the recycle gas the necessary amount of carbon can be eliminated without realizing a loss of hydrogen from the system. As a result, less natural gas need be added to compensate for the loss in reduction capacity of the recycle gas realized in those known systems requiring a purge or vent of a substantial portion of the recycle gas.

The present invention relates to a method of operating a vertical moving bed reduction reactor for reducing iron ore to sponge iron to obtain a desired degree of metallization of the reduced ore and a desired degree of carburization by supplying to the reactor a predetermined flow of reducing gas substantially comprising carbon monoxide and hydrogen and, varying the ratio of reducing gas flow to the reduction zone to the reducing gas flow to the cooling zone to vary at least one of the amount of metallization and the amount of carburization while maintaining the carbon dioxide concentration in both the reduction zone and cooling zone at a value which yields the desired degree of metallization and carburization of the sponge metal product.

DETAILED DESCRIPTION OF CERTAIN PREFERRED EMBODIMENTS

Figure 1:
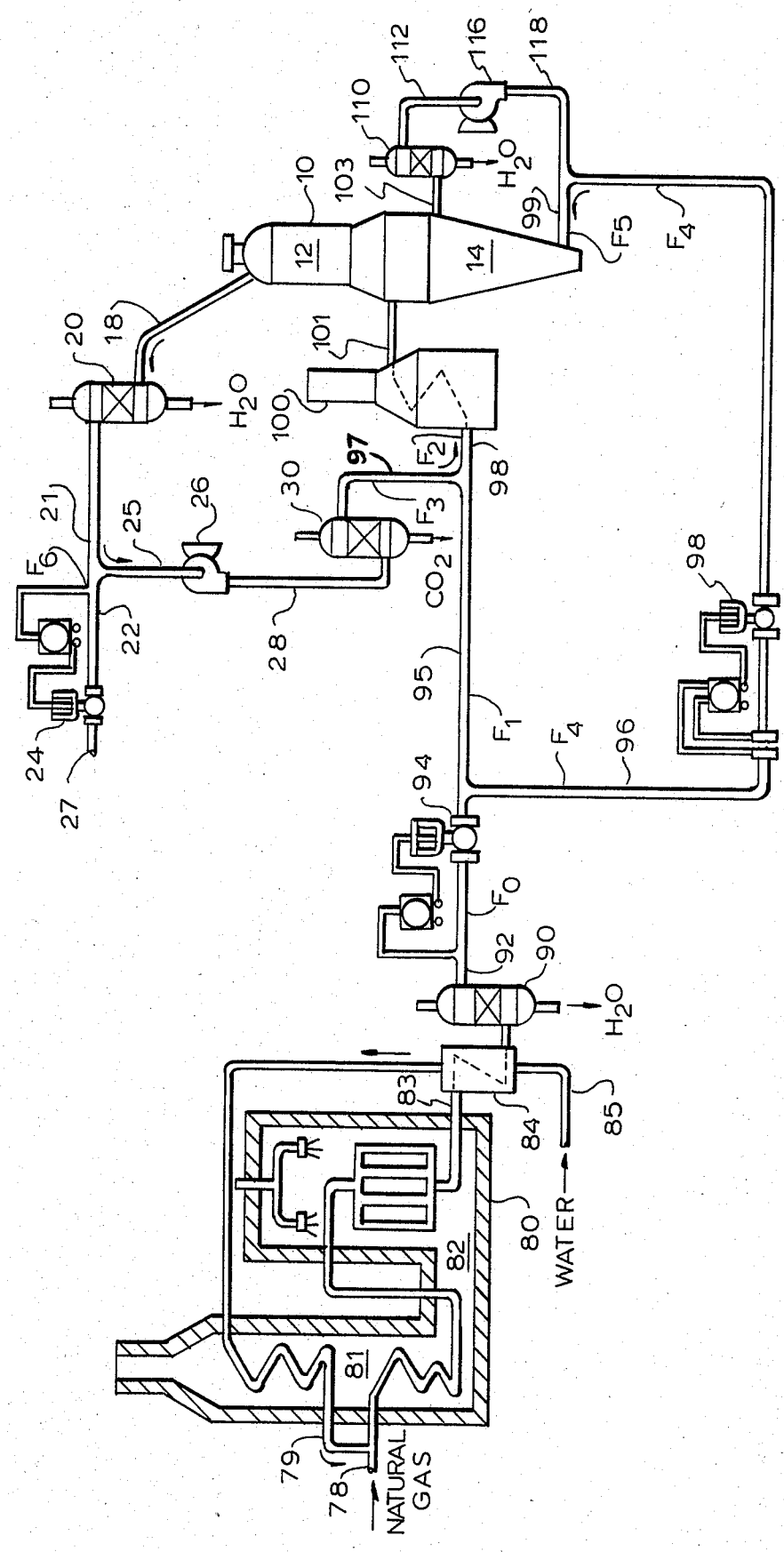
Figure 2:
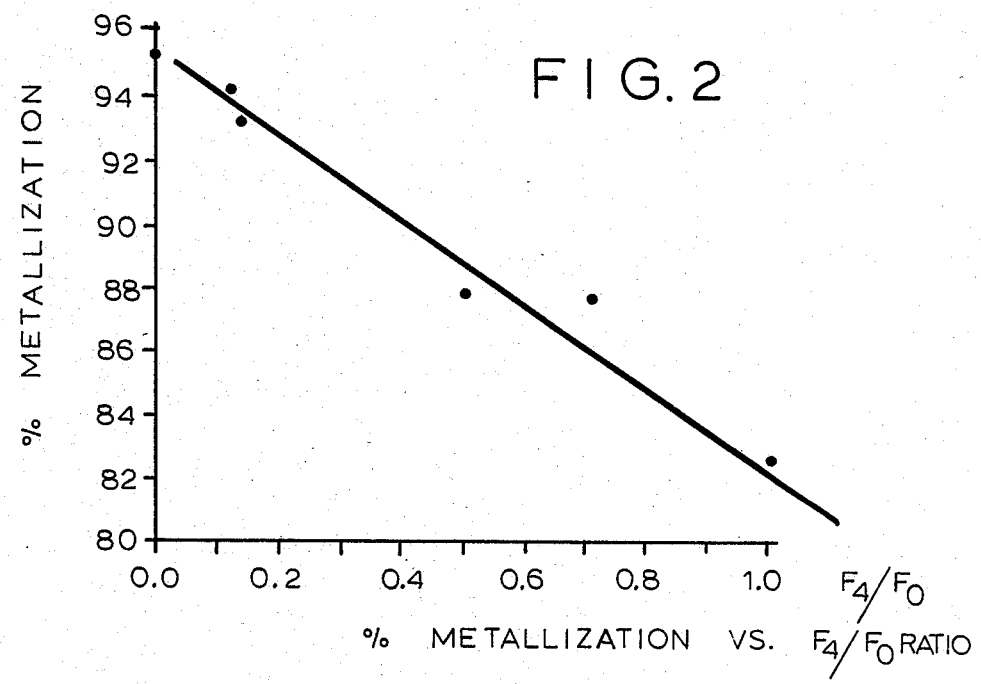
Figure 3:
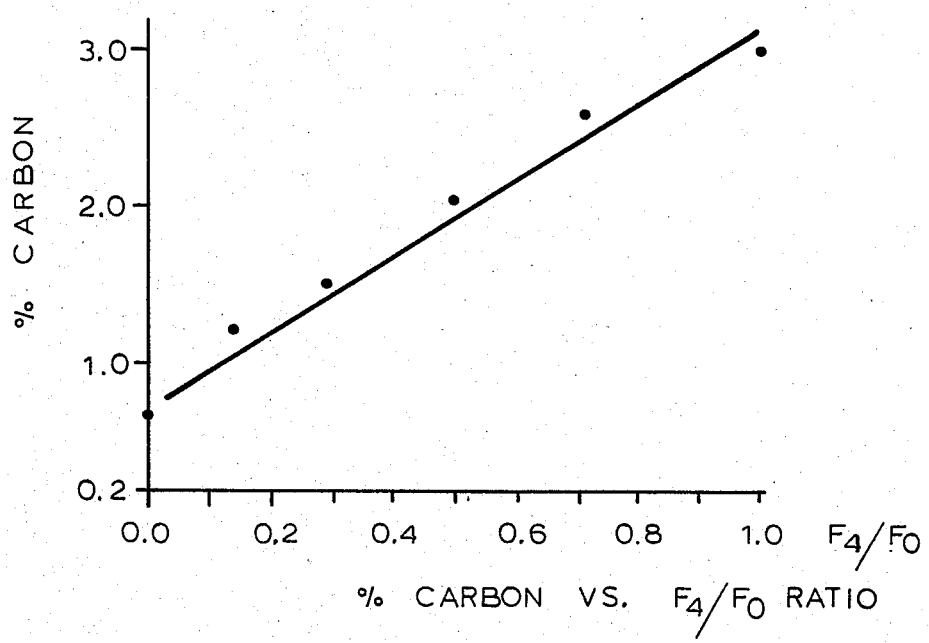
Figure 4:
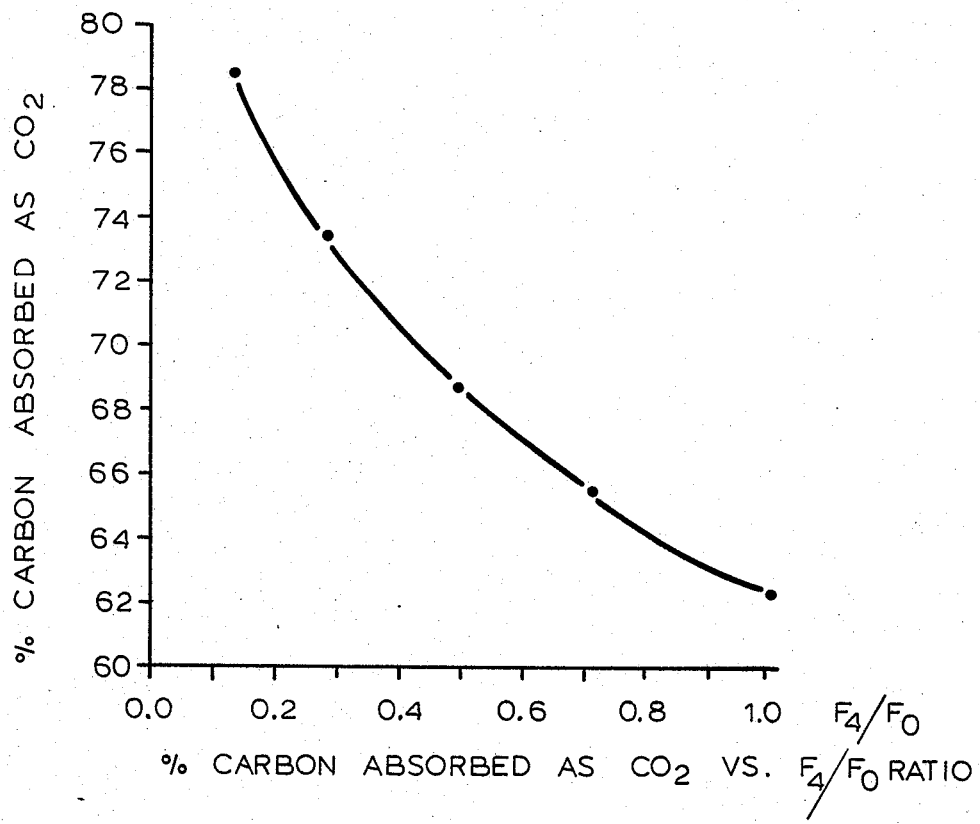

The objects and advantages of the present invention can best be understood and appreciated by reference to the accompanying drawings wherein FIG. 1 illustrates diagrammatically a vertical shaft, moving bed reactor system for carrying out a preferred embodiment of the method of the invention, FIG. 2 shows a curve comparing the percent metallization as a function of the relative gas flow to the reducing and cooling zones, FIG. 3 shows a curve for the percent carbon on the sponge iron, i.e. carburization, as a function of the relative gas flow to the reducing and cooling zones, and FIG. 4 sets forth a curve of the total percent of carbon absorbed in the form of $CO_2$ as a function of the relative gas flow to the reducing and cooling zones.

Referring first to FIG. 1, a catalytic reforming unit 80 of a known type is shown to which natural gas is fed through a pipe 78 and steam is injected through a pipe 79. The natural gas and steam are pre-heated by being passed through coils in the stack portion 81 of reformer 80 and a mixture of the pre-heated natural gas and steam are caused to flow through a heated catalyst bed in the lower portion 82 of the reformer wherein they are converted to a gas mixture consisting largely of carbon monoxide, hydrogen and water vapor in a manner known in the art. The reformed gas leaves reformer 80 through a pipe 83 and enters a quench cooler 90 wherein the gas is cooled and de-watered. Upon leaving cooler 90 the gas flows through a pipe 92 provided with an automatic flow controller 94 at a flow rate designated Fo. The gas stream Fo splits into two separate streams, namely F1 flowing through a pipe 95 for use as make-up reducing gas in the reduction loop and F4 flowing through a pipe 96 for use as make-up cooling gas in the cooling loop. Thus the predetermined first stream of fresh reducing gas $F_0$ is split into a second stream $F_1$ and a third stream $F_4$.

Referring specifically to the reducing loop shown in FIG. 1, gas stream F1 flowing through pipe is combined with the spent gas from the reactor being recycled to the reduction zone and designated as F3 to form a reducing gas stream F2 which flows through a pipe 98 into a heater 100 wherein the gas is heated in known manner to a temperature in the range of 700° C. to 1100° C., preferably about 900° C. The heated reducing gas exits heater 100 through a pipe 101 and enters the reduction zone 12 of the reactor designated by the numeral 10. The reducing gas entering reduction zone 12 of reactor 10 is caused to flow upwardly therethrough in contact with the descending iron ore to effectuate reduction of the iron oxides therein. The spent reducing gas leaves reactor 10 through a pipe 18 and enters cooler 20 to be cooled and de-watered. The cooled and de-watered spent gas leaves cooler 20 through a pipe 21 with a portion of the gas designated F6 being vented or transported to storage through a pipe 22 provided with flow controller 27. The gas stream designated F6 can also be used as fuel in reformer 80 or heater 100.

The major portion of the spent gas from the reactor is caused to flow through a pipe 25 and into the suction side of a compressor 26. The compressed spent gas leaves compressor 26 through a pipe 28 and flows into a carbon dioxide absorption unit 30 wherein carbon dioxide contained in the spent gas is removed. Upon removal of the carbon dioxide from the spent gas, the gas stream designated as F3 flows through a pipe 32 provided with a flow controller 97 and is combined with gas stream F1 as described above.

As mentioned above, a portion of gas stream Fo can be caused to flow through pipe 96 into the cooling loop of the reduction system as make-up cooling gas. The make-up cooling gas F4 flows through pipe 96 provided with a flow controller 98 to combine with the cooling gas being recirculated to the cooling loop of reactor 10 to form a cooling gas stream designated F5. Gas stream F5 flows through a pipe 99 and is fed to the cooling zone 14 of reactor 10. The cooling gas is caused to flow through the cooling zone in contact with the descending reduced sponge iron to cool and carburize the sponge iron therein. The cooling gas leaves cooling zone 14 through a pipe 103 and enters a cooler 110 wherein it is cooled and de-watered. The cooled and de-watered gas stream flows through a pipe 112 and into the suction side of compressor 116 wherein it is pumped back to cooling zone 14 through a pipe 118 after being combined with stream F4 to form stream F5.

It should be noted that in the cooling loop of the embodiment described in FIG. 1 no external purge is required. A portion of make-up stream F4 is consumed by the reduction and carburization reactions described above occurring in cooling zone 14 while the remaining portion of the make-up cooling gas fed to cooling zone 14 flows into reduction zone 12 within reactor 10. By the absorption of carbon dioxide from the spent gas recycle carbon can be selectively removed from the system without any loss of other reducing components thereby minimizing the amount of natural gas which need be introduced to the process. In actual operation, gas streams Fo, F2 and F5 are desirably maintained at a constant value since these streams determine the optimal design of the reforming unit, heater and cooling loop compressor. A typical gas composition of stream Fo is:

|  | % VOLUME |
| --- | --- |
| $H_2$ | 73.0 |
| CO | 14.2 |
| $CO_2$ | 8.5 |
| $CH_4$ | 3.5 |
| $H_2O$ | 0.5 |
| $N_2$ | 0.3 |

The carbon monoxide contained in stream Fo is used as a reducing agent according to reactions (3), (4) and (5) described above or as a carburizing agent according to reaction (8) above. As mentioned above, it is known that in the direct reduction of sponge iron carbon monoxide tends to reduce iron oxide at higher temperatures while tending to deposit carbon on the sponge product at lower temperatures. In order to control both the metallization and carbon content of the sponge product to achieve a "balanced", product with either a high metallization and low carburization or inversely a lower metallization and higher carbon content, the relative make-up gas flow F4 to the cooling loop and F1 to the reducing loop are controllably varied. In other words, by maintaining gas flows Fo, F2 and F5 constant and by varying the gas flow ratio F4/Fo, a "balanced" sponge iron product is obtained.

FIG. 2 illustrates the effect on metallization of the sponge iron as a function of variation in the F4/Fo ratio. Similarly, FIG. 3 demonstrates the effect on the percent carbon in the sponge product as a function of the F4/Fo ratio. It should be clear from FIGS. 2 and 3 that as the F4/Fo ratio approaches zero a product having a very high metallization and low carbon content is obtained whereas when the F4/Fo ratio tends toward 1.0 a lower metallization and higher carbon content is realized. In order to realize the important effect that varying the F4/Fo ratio has on the metallization and carburization of the sponge iron product, the carbon dioxide content in stream F3 should be approximately zero. To obtain the desired control of the reduction and carburization reactions occurring in the reduction and cooling zones there should be little, or no, carbon dioxide in the reducing or cooling gas fed to the reactor. By comparing FIGS. 2 and 3, it can be seen that the product having at least 94% metallization will have less than 1.0% carburization while a metallization in the range of 80% to 84% will correspondingly be carburized about from 3.2% to 2.7%.

FIG. 4 illustrates the relationship between the percentage of carbon absorbed as carbon dioxide calculated on the basis of the total carbon entering the system as natural gas as a function of the F4/Fo flow ratio. The curve of FIG. 4 clearly indicates that for a F4/Fo ratio approaching zero about 80% of the carbon entering the system is removed as carbon dioxide in the absorber. This indicates that the amount of carbon in the product will be relatively low. For a F4/Fo ratio approaching 1.0 about 62% of the carbon entering the system is removed as carbon dioxide with the remainder of the carbon being deposited on the sponge iron. In both cases, the overall carbon balance in the system is properly maintained without the need for a large gas purge thereby increasing the overall efficiency of the reduction process.

The terms and expressions which have been employed are used as terms of description and not of limiation and there is no intention in the use of such terms and expressions to exclude any equivalents of the features shown and described, or portions thereof, it being recognized that various modifications are possible within the scope of the invention.

We claim:

1. A method of operating a vertical moving bed reduction reactor for reducing iron ore to sponge iron, said reactor having a reduction zone in the upper portion thereof within which said ore is reduced by a hot reducing gas flowing therethrough at a temperature between 700° C. to 1000° C. wherein the reduction by carbon monoxide and hydrogen contained in said reducing gas is promoted, and having a cooling zone in the lower portion thereof within which the reduced ore is cooled to a temperature below 200° C. and wherein carburization of the reduced ore by carbon monoxide in the cooling gas flowing therethrough is promoted, said reaction zone forming a part of the gas flow loop through which the reducing gas is recycled to the reduction zone and in which the recycled gas passes through a cooler to remove water therefrom and through a carbon dioxide removal unit to remove carbon dioxide therefrom, and a heater to reheat the gas before it re-enters the reduction zone, said cooling zone forming part of a cooling gas loop through which the externally-cooled gas is recycled to said cooling zone, said method comprising the steps of supplying a predetermined flow of fresh reducing gas largely composed of hydrogen and carbon monoxide as a first stream, splitting said first stream into a second stream fed to said reducing gas loop and a third stream fed to said cooling gas loop, maintaining the flow rate of said first stream substantially constant, and varying the flow ratio of said second stream to said third stream to increase the degree of metallization and decrease the degree of carburization of the product sponge iron or to decrease the degree of metallization and increase the degree of carburization of the product sponge iron.

2. The method according to claim 1, wherein essentially all of the carbon dioxide in said recycled reducing gas is removed therefrom before said recycled reducing gas is returned to the reduction zone.

3. A method according to claim 1, wherein most of the fresh reducing gas flow is supplied to said reduction loop to yield sponge iron having a metallization of at least 94% and a carbon content of less than 1.0%.

4. A method according to claim 1, wherein most of the fresh reducing gas flow is supplied to said cooling loop to yield sponge iron having a metallization within the range of 80% to 84% and a carbon content within the range of 2.7% to 3.2%.

5. A method according to claim 1, wherein the relative amounts of fresh reducing gas flow to said two loops via said second and third streams is adjusted by regulating the flow of fresh reducing gas in said third stream.

6. A method according to claim 1, further comprising maintaining the carbon dioxide concentration by selective removal thereof from said reducing gas loop to give a product with a predetermined degree of metallization and carburization.

* * * * *

UNITED STATES PATENT AND TRADEMARK OFFICE
CERTIFICATE OF CORRECTION

PATENT NO. : 4,584,016
DATED : April 22, 1986
INVENTOR(S) : Jorge O. Becerra-Novoa et al.

It is certified that error appears in the above-identified patent and that said Letters Patent is hereby corrected as shown below:

Column 7, line 5, delete "reaction" and insert --reduction--.

Signed and Sealed this

Fifth Day of August 1986

[SEAL]

Attest:

DONALD J. QUIGG

*Attesting Officer*  *Commissioner of Patents and Trademarks*